April 7, 1959  P. N. CALDWELL  2,881,371
POWER TRANSMISSION
Filed May 23, 1957
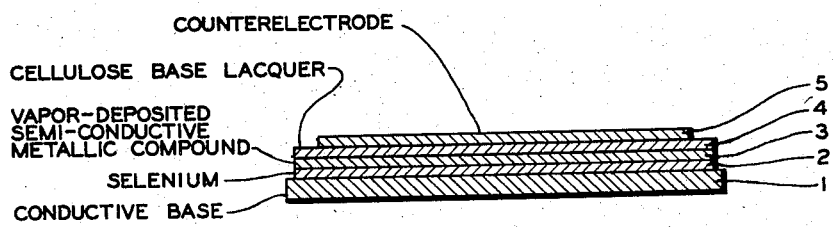
COUNTERELECTRODE
CELLULOSE BASE LACQUER — 5
VAPOR-DEPOSITED
SEMI-CONDUCTIVE
METALLIC COMPOUND — 4, 3, 2
SELENIUM — 
CONDUCTIVE BASE — 1
*INVENTOR.*
PAUL N. CALDWELL
BY
ATTORNEY

United States Patent Office 2,881,371
Patented Apr. 7, 1959

2,881,371

POWER TRANSMISSION

Paul N. Caldwell, Northwoods, Mo., assignor to Vickers Incorporated, Detroit, Mich., a corporation of Michigan Application May 23, 1957, Serial No. 661,215

10 Claims. (Cl. 317—241)

This invention relates to power transmission and more particularly to selenium devices, and to methods of making such devices.

Selenium cells for use as rectifiers usually comprise a thin layer of crystalline selenium on a suitable base or carrier plate of nickel-coated aluminum or any conducting material which will not react unfavorably with selenium, and a metal counterelectrode overlying the selenium surface. In a common method of manufacturing selenium cells, an adherent layer of amorphous selenium is first applied to the base plate by melting selenium thereon, or condensing selenium vapor thereon, or by subjecting a layer of powdered selenium on the plate to heat and pressure. The coated plate is then given a suitable annealing or heat treatment to change the selenium layer from its amorphous state to the crystalline form. During the usual heat treatment, the plate is subjected to a temperature slightly below the melting point of selenium, for example at a temperature within the range of 200° C. to just under the melting point, for a time sufficient to develop the crystal formation of the selenium. The annealing of selenium for this purpose has a time and temperature relation well known in the art. The exposed surface of the selenium layer is usually treated or coated to form an "artificial barrier" before the application of the counterelectrode, the latter being, for example, a low melting point metal, such as the alloy of 30% tin (by weight) and 70% cadmium applied to the selenium surface by any suitable method such as spraying. After the counterelectrode is in place, the cell is electroformed (often referred to as forming) to improve the rectification, for example by sending current through the cell in the inverse direction until the cell forms to the desired inverse resistance.

Some of the criteria of cell evaluation are the inverse characteristics, the forward characteristics, the rectification ratio (ratio of inverse to forward voltage), shelf and operational aging, and operation and life at high ambient temperatures. The forward direction of a cell is the direction of lesser resistance to current flow through the cell and the reverse or inverse direction of the cell is the direction of greater resistance to current flow. Inverse voltages are related to inverse resistances and currents, while forward voltages are related to forward currents and resistances. The amount of time required to electroform a cell is an important economic factor in the manufacture of cells.

Aging is any persisting change, except failure, which takes place for any reason in either the forward or reverse resistance characteristic of the rectifier.

As one indicia of reverse resistance and cell performance, it is customary in the metallic rectifier industry to refer to the alternating current R.M.S. voltage rating of the cell. This rating is based on the maximum inverse voltage at which the reverse current will not exceed a safe value. At a safe inverse current value abnormal aging and complete breakdown may be avoided. If a cell is operated at a higher voltage than its normal inverse voltage rating, shorter life is to be expected.

It is customary in the industry and advised by NEMA to derate rectifiers at ambient temperatures above 35° C. to preserve the same life expectancy which would obtain at an ambient temperature of 35° C. Either the input voltage or the output current, or a combination of both, is rated. It is typical to derate in current above 35° C. and in voltage above 50° C.

Among the characteristics often sought for in a rectifier cell are high inverse resistance, high rectification ratio, shorter electroforming times, and freedom from rapid shelf and operational aging, not only at 35° C. ambient, but also at high ambient temperatures.

The application of what may be termed "barrier agents" on the selenium surface before the application of the counterelectrode is well known in the art, and numerous such agents have been employed resulting in many different effects on the characteristics of the final cell.

Cellulose base lacquers have been extensively used as artificial barrier forming agents. The prior practice has been to apply the lacquer directly to the surface of crystalline selenium before the application of the counterelectrode. Although such lacquer treatment has enjoyed wide usage, it is accompanied by disadvantages. While such lacquer treatment may increase inverse ratings, such increases are always accompanied by an undesirably high increase in forward voltages, which holds the rectification ratio down. Another disadvantage of lacquer barrier cells of the prior art is that they cannot be operated at high ambient temperatures without quick breakdown. This is thought to be due to the fact that these temperatures are above the decomposition point of lacquer.

Semiconducting vapor-depositable metallic compounds have heretofore been employed as barrier forming agents in selenium cells with some measure of success, and for some purposes provide acceptable cells.

I have discovered that a selenium cell with a barrier layer of vapor-deposited semiconducting metallic selenide, metallic sulfide, metallic telluride, or solid solutions of these can be improved in major characteristics by applying a cellulose base lacquer over the vapor-deposited metallic compound, without also incurring the expected but undesirable high increase in the forward voltages heretofore experienced in connection with the use of lacquer as a barrier forming agent. The improvement in major characteristics includes much higher inverse voltage ratings together with high rectification ratios, shorter forming time, and a much greater life expectancy not only at normal room temperature but also at high ambient temperatures.

It is an object of the present invention to provide new and improved selenium cells and a method for making them.

Another object of the invention is to provide a novel treatment of an exposed surface of a selenium layer for use in rectifier devices.

Another object of the invention is to provide a novel barrier in a selenium cell and a method for producing the same.

Another object is to provide a selenium cell characterized by a high inverse R.M.S. voltage rating.

Another object is to increase the rectification ratio of a selenium rectifier cell.

Another object is a selenium device characterized by a high inverse voltage rating and a high rectification ratio.

Still another object of the invention is to provide a selenium cell characterized by a high inverse voltage rating, a high rectifier ratio, and a long life.

A further object is the provision of a selenium cell which can be operated at high ambient temperatures without requiring derating.

Further objects and advantages of the present invention will be apparent from the following description, reference being had to the single figure drawing wherein a preferred embodiment of the invention is clearly shown in exaggerated detail.

Referring now to the drawing, a rectifier made in accordance with the present invention includes a base electrode 1, a layer of selenium 2, a vapor-deposited layer 3 made of a semiconducting metallic selenide, metallic sulfide, metallic telluride, or a solid solution of these, a layer of lacquer 4 on the layer of metallic compound 3, and a counterelectrode 5.

The base 1 may be made of any of the many electrical conductors known in the art to be suitable for selenium cell construction, for example, nickel, steel, aluminum, nickeled steel, nickeled aluminum, or any metal or other conductor to which the selenium will adhere but which will not react unfavorably with the selenium. The selenium layer or coating 2 is provided on the plate 1 by any suitable method, for example, as follows: an adherent layer of partially crystallized selenium is first applied to the base by subjecting a layer of powdered amorphous selenium on the base to heat and pressure which softens, smoothes, and partially crystallizes the selenium. The selenium is then completely changed to the crystalline form by suitable annealing or heat treatment, for example the heat treatment hereinbefore described.

After the selenium has been changed to its crystalline form, the layer of metallic compound 3 is vapor-deposited on the exposed surface of the selenium preferably in a high vacuum. As hereinbefore stated, the metallic compound employed in making layer 3 is any semiconductive metallic sulfide, metallic selenide, metallic telluride, or a solid solution involving at least two of these metallic compounds, which is capable of being vapor deposited. Examples of the vapor-depositable semiconducting metallic sulfides, metallic selenides, and metallic tellurides, which are especially desirable in the practice of the invention are the respective sulfides, selenides, and tellurides of cadmium, tin, bismuth, thallium, and germanium, and the solid solutions of these metallic compounds. The vapor-deposition may be done in an evacuated enclosure containing the crystalline selenium coated base by placing powder or pellets of the metallic compound in filaments or boats within the enclosure and heating the filaments thereby to heat and vaporize the material. The filaments may be heated indirectly or directly by passing electric current therethrough. The residual atmosphere for the vapor-deposition of the metallic compound may be air or an inert gas. Excellent results have been obtained with air as the residual atmosphere.

Although the vapor-deposition may be effected at higher pressures, best all-around results were obtained by vapor-depositing the metallic compound on the selenium in the enclosure evacuated to a pressure below 11 microns of mercury. Excellent cells have been produced by vapor-deposition of the metallic compound at pressures ranging from about 0.1 to about 10 microns of mercury. The following are some examples of the above-named metallic compounds used in practicing the invention and successfully vapor-deposited on selenium at pressures ranging from about .1 to about 5 microns of mercury, and made into rectifier cells in accordance with this invention: cadmium sulfide; cadmium selenide; cadmium sulfoselenide; germanium di-selenide; and bismuth tri-sulfide. While the temperature is not critical, the temperature to which the metallic compound is heated should be such as to induce vaporization at a reasonably rapid rate at the pressure employed. Evaporation temperatures for many of the metallic compounds contemplated herein are given in various handbooks and in the literature. The temperature at which a particular metallic compound will evaporate can also be easily determined empirically by known methods, for example by visually checking while adjusting the applied heat. Temperatures around 1000° C. will be found generally suitable for this process for many of the metallic compounds, especially for cadmium sulfide, cadmium selenide and cadmium sulfoselenide at the low pressures disclosed herein. While evaporation time is not critical, an evaporating time of the order of 15 minutes has been found to be desirable.

After the deposition of the metallic compound to make layer 3, the latter is coated with a cellulose base lacquer, preferably by spraying. As is well known, a cellulose base lacquer includes primarily the solid cellulose base and a volatile solvent or combination of solvents. As a result of the application of the lacquer over layer 3, a layer 4 of cellulose base lacquer solids remains after the solvents have evaporated. It is well known to control the details and specific make up of lacquers to suit environmental conditions and the particular application techniques and tools involved. The following are some specific examples (proportions given by weight) of cellulose base lacquers which may be used in practicing the invention and which are particularly suited to application by spraying:

Lacquer I—ethyl cellulose 1%, Cellosolve acetate 49%, acetone 50%

Lacquer II—cellulose acetate 1%, Cellosolve acetate 49%, acetone 50%

Lacquer III—nitrocellulose 1%, Cellosolve acetate 49%, acetone 50%

Although commercially obtainable cellulose base lacquers generally contain, in addition to the cellulose base, minor amounts of other solids, such as plastisizers, such lacquers have been used successfully in practicing the invention without any noticeable reduction in the advantages provided by the cellulose base solids. One such commercial cellulose nitrate base lacquer is Maas and Waldstin #49DL, whose proportions by weight of solvents to solids was changed from 87:13 to about 99:1 in order to facilitate the application thereof on the metallic compound layer 3.

Any cellulose base lacquer specifically mentioned or within a class mentioned herein may be used to provide the layer 4 on any metallic compound layer 3 specifically mentioned or within a class mentioned herein.

While the invention should not be restricted to a specific thickness of the layer 3 and superposed layer 4, an order of thickness which has attained good results is .0083 gram of the metallic compound per square inch, and .00053 gram of cellulose base lacquer solids per square inch. As the thickness of layer 3 is reduced forming time is increased. As the thickness is increased, forming time decreases but shelf aging increases.

After layer 4 has been applied over layer 3, a front electrode 5 is provided over the layer 4, for example by spraying thereon a layer of a low melting point metal or alloy, such as one composed of 70% cadmium and 30% tin. Thereafter the cell is electroformed, for example by passing current through the cell in the inverse direction until the cell forms up to the desired inverse resistance.

Advantages of the invention may be better grasped from a comparison of selenium cells employing the composite barrier of the present invention with selenium cells having as a barrier agent only the sulfide, telluride or selenide of the parent metal, that is without the addition of the lacquer layer 4 between the layer 3 and the front electrode 5.

For example two groups A and B of selenium rectifier cells were made having the same layer of cadmium sulfide vapor-deposited over the selenium under a pressure between .1 and 3.5 microns of mercury. However, while group B had a layer of cellulose nitrate base lacquer between the cadmium sulfide layer and the front electrode, group A had no lacquer layer. The characteristics of the resulting cells after forming for the same period of time were as follows:

|  | Inverse V | Forward V |
|---|---|---|
| Group A | 28 | 1.1 |
| Group B | 43.8 | .53 |

Thus group B had a 325% higher rectification ratio.

Another batch of selenium rectifier cells employing a layer of cadmium sulfo-selenide vapor-deposited on the selenium layer under a pressure between .1 and 5 microns of mercury, and divided into two groups C and D, C without lacquer and D with cellulose nitrate base lacquer, gave the following after same forming times.

|  | Inverse V | Forward V |
|---|---|---|
| Group C | 34.2 | .86 |
| Group D | 38.9 | .75 |

When a cell with any one of the previously mentioned metallic compounds as a barrier, but without a lacquer layer, is formed beyond a normal applied voltage of 45 volts per cell, the inverse reaches a plateau where the inverse goes up very slowly, but the forward rises rapidly. In other words, there is a point in the forming where the inverse to forward rectification ratio is a maximum. With the same type of cell but with the addition of the lacquer layer as in the composite barrier of the present invention, there is also a point of maximum rectification ratio, but it comes at a higher inverse voltage, usually about 60 volts but often higher, in some cases reaching an inverse of 90 volts with a rectification ratio of 90/.98.

The experience of the prior art has been that shorter operational life is experienced as the inverse voltage rating of a cell is raised. For example, a prior art selenium rectifier cell employing a cadmium sulfo-selenide barrier layer, but without the additional lacquer layer, will have at 30° C. ambient a life expectancy of 35,000 hours at 18–26 volts inverse and 18,000 hours at 36–40 volts inverse. The same cell at 120° C. ambient and 36–40 volts inverse has a life expectancy of about 540 hours. However, actual tests have shown that the same cell with the addition of the lacquer layer of the present invention will have at 30° C. a life expectancy of over 30,000 hours at 60 volts inverse rating. Tests show that 60 volt inverse cells made in accordance with the present invention have a life expectancy of about 7,000 hours at 75° C. ambient; about 4,000 hours at 90° C. and about 1,000 hours at 120° C. This is surprising in view of the fact that these temperatures are above the decomposition temperature of cellulose base lacquer.

The elements specifically named in the following vapor-depositable, semiconducting, metallic selenides, metallic tellurides, and metallic sulfides, obviously are respectively selenium, tellurium and sulfur, and they are in group VI A of the periodic table of elements. As stated herein the addition of a cellulose base lacquer layer 4 on layer 3 of vapor-depositable, semiconductive, metallic compound which has been vapor-deposited on the selenium of a selenium rectifier cell will provide considerable advantages and improvements in the rectifier cell. Also, it has been stated herein that the metallic compound 3 may be any vapor-deposited semiconductive metallic sulfide, metallic selenide, metallic telluride, or a solid solution involving at least two of these compounds. It is known that in a solid solution of two or more of these compounds, the specific compounds as such do not occur therein. In such a solid solution the named group VI A element of one of the specific compounds is substituted for in the crystal structure in part by the group VI A element named in the other specific compound involved in a solid solution of two such compounds, or is substituted for in part by the group VI A elements named in the other such compounds when more than two such compounds are involved in the solid solution. Thus, another way of defining the specific class of metallic compounds which may be used in making the composite compounds of the present invention is as follows: a vapor-barrier of the present invention is as follows: a vapor-depositable, semiconducting metallic sulfide, metallic selenide, metallic telluride, or any of these compounds wherein the named group VI A element has been substituted in part by at least one other group VI A element named in said three metallic compounds.

For example, although cadmium sulfo-selenide is a solid solution of cadmium sulfide and cadmium selenide, the latter two compounds do not appear as such in pure cadmium sulfo-selenide. However, although cadmium sulfo-selenide is definitely not cadmium selenide, it is proper to refer to it as cadmium selenide with sulfur atoms substituted for some of the selenium atoms in the crystals. The resultant compound cadmium sulfo-selenide differs from and, when pure, does not contain as such, cadmium sulfide or cadmium selenide, and the use of each as a barrier in selenium cells provides different effects, the cadmium sulfo-selenide being the most advantageous. Although each of the various metallic compounds mentioned herein may produce different effects when used as the barrier in selenium cells, such cells with any of the metallic compounds mentioned herein are improved and enhanced in the same way by the addition of the cellulose base lacquer layer in accordance with the present invention. In all cases the addition of the lacquer layer 4 on the metallic compound layer 3 will allow higher inverse voltages and higher rectification ratios than the same cell without the lacquer treatment.

It is to be understood that the vapor-depositable, semiconducting, metallic compounds of which layer 3 may be made include compounds that include one or more parent metals, and one or more of the three named group VI A elements. For example, cadmium selenide is such a compound with one parent metal (cadmium) and one group VI A element (selenium). Cadmium sulfo-selenide is an example of such a compound having one parent metal (cadmium) and two group VI A elements (sulfur and selenium). Other examples of the type of such a compound with two group VI A elements are thallium sulfide-selenide and tin selenide telluride. Cadmium gallium-telluride is an example of such a compound with two parent metals (cadmium and gallium) and one group VI A element (tellurium). Another example of the latter type is bismuth cadmium sulfide.

The following are some complete specific examples of the composite barrier of the invention in complete selenium cells which may be made in accordance with the present disclosure.

| Example | Metallic Compound Layer 3 | Lacquer Layer 4 |
|---|---|---|
| A | Cadmium sulfide | cellulose acetate base. |
| B | do | cellulose nitrate base. |
| C | do | ethyl cellulose base. |
| D | Cadmium selenide | cellulose acetate base. |
| E | do | cellulose nitrate base. |
| F | do | ethyl cellulose base. |
| G | Cadmium sulfo-selenide | cellulose acetate base. |
| H | do | cellulose nitrate base. |
| I | do | ethyl cellulose base. |
| J | Germanium di-selenide | cellulose acetate base. |
| K | do | cellulose nitrate base. |
| L | do | ethyl cellulose base. |
| M | Bismuth tri-sulfide | cellulose acetate base. |
| N | do | cellulose nitrate base. |
| O | do | ethyl cellulose base. |
| P | Bismuth mono-sulfide | cellulose acetate base. |
| Q | do | cellulose nitrate base. |
| R | do | ethyl cellulose base. |
| S | Thallium sulfide-selenide | cellulose acetate base. |
| T | do | cellulose nitrate base. |
| U | do | ethyl cellulose base. |

While the form of embodiment of the invention as herein disclosed constitutes a preferred form, it is to be understood that other forms might be adopted, all coming within the scope of the claims which follow.

What is claimed is as follows:

1. A blocking layer device comprising: a selenium surface; a layer on said surface formed by exposing said surface to the vapor of a metallic compound selected from the group consisting of the semiconducting, vapor-depositable, metallic sulfides, metallic selenides, metallic tellurides, and each of the three last mentioned subgroups in each of which the named group VI A element is partially substituted by at least one other group VI A element named in said three subgroups; and on the latter layer a layer formed by the application of a cellulose base lacquer.

2. A blocking layer device comprising: a selenium surface; a layer on said selenium surface of a vapor-deposited metallic compound selected from the group consisting of the semiconducting, vapor-depositable, metallic sulfides, metallic selenides, metallic tellurides, and each of the three last mentioned subgroups in each of which the named group VI A element is partially substituted by at least one other group VI A element named in said three subgroups; and a layer of cellulose base lacquer on said vapor-deposited layer.

3. A blocking layer device comprising: a conductive base; a layer of selenium on said base; a layer on said selenium of a vapor-deposited metallic compound selected from the group consisting of the semiconducting, vapor-depositable, metallic sulfides, metallic selenides, metallic tellurides, and each of the three last mentioned subgroups in each of which the named group VI A element is partially substituted by at least one other group VI A element named in said three subgroups; a layer of cellulose base lacquer on said vapor-deposited layer; and an electrode on said lacquer layer.

4. A blocking layer device comprising a conductive base, an electrode, selenium between the base and the electrode, and a barrier between the selenium and the electrode, said barrier comprising a first layer and a second layer between the first layer and the electrode, the first layer comprising a vapor-deposited metallic compound selected from the group consisting of the semiconductive, vapor-depositable, metallic sulfides, metallic selenides, metallic tellurides, and each of the three last mentioned subgroups in each of which the named group VI A element is partially substituted by at least one other group VI A element named in said three subgroups; the second layer comprising cellulose base lacquer.

5. A blocking layer device comprising: a conductive base; a selenium surface on said base; on said selenium surface a vapor-deposited layer of a metallic compound selected from the group consisting of the semiconducting, vapor-depositable, metallic sulfides, metallic selenides, metallic tellurides, metallic sulfides in which the sulfur is partially substituted by a member of the group consisting of selenium, tellurium, and selenium and tellurium, metallic selenides in which the selenium is partially substituted by a member of the group consisting of sulfur, tellurium, and sulfur and tellurium, and metallic tellurides in which the tellurium is partially substituted by a member of the group consisting of sulfur, selenium, and sulfur and selenium; on said layer a layer comprising cellulose base lacquer; and an electrode on the last said layer.

6. A blocking layer device comprising a conductive base, a selenium surface on said base, a vapor-deposited layer comprising cadmium sulfide on said selenium surface, on said layer a layer comprising cellulose base lacquer, and an electrode on the last said layer.

7. A blocking layer device comprising a conductive base, a selenium surface on said base, a vapor-deposited layer comprising cadmium sulfo-selenide on said selenium surface, on said layer a layer comprising cellulose base lacquer, and an electrode on the last said layer.

8. A blocking layer device comprising a conductive base, a selenium surface on said base, a vapor-deposited layer comprising cadmium selenide on said selenium surface, on said layer a layer comprising cellulose base lacquer, and an electrode on the last said layer.

9. A blocking layer device comprising a conductive base, a selenium surface on said base, a vapor-deposited layer comprising bismuth tri-sulfide on said selenium surface, on said layer a layer comprising cellulose base lacquer, and an electrode on the last said layer.

10. A blocking layer device comprising a conductive base, a selenium surface on said base, a vapor-deposited layer comprising germanium di-selenide on said selenium surface, on said layer a layer comprising cellulose base lacquer, and an electrode on the last said layer.

References Cited in the file of this patent

UNITED STATES PATENTS

| | | |
|---|---|---|
| 2,496,692 | Blackburn | Feb. 7, 1950 |
| 2,554,237 | Blackburn | May 22, 1951 |